Figure 1:
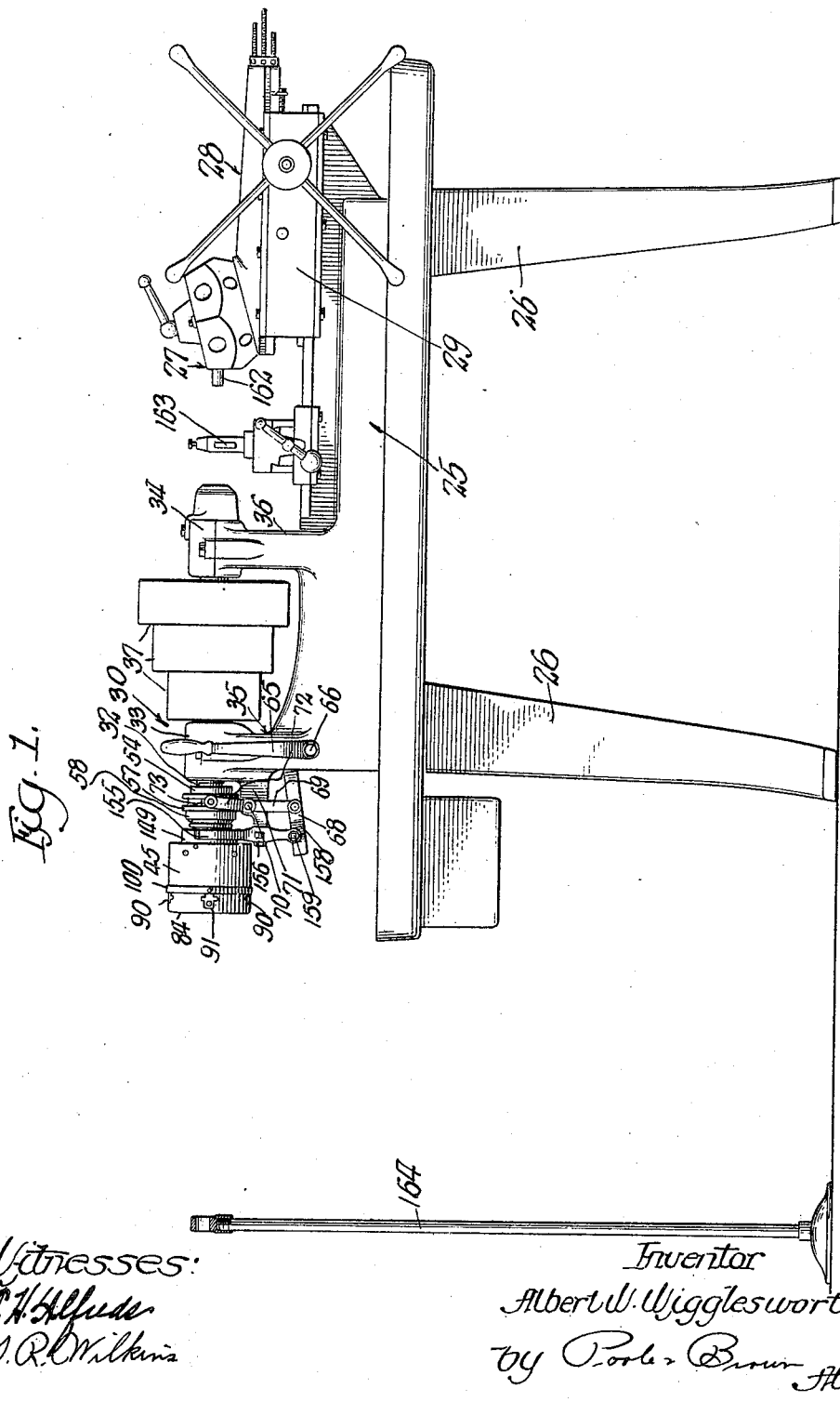

A. W. WIGGLESWORTH.
WORK FEEDING DEVICE FOR METAL WORKING AND OTHER MACHINES.
APPLICATION FILED MAY 19, 1909.

972,588.  Patented Oct. 11, 1910.
7 SHEETS—SHEET 1.

Witnesses:
T. H. Alfred
L. R. Wilkins

Inventor
Albert W. Wigglesworth
by Poole & Brown Attys

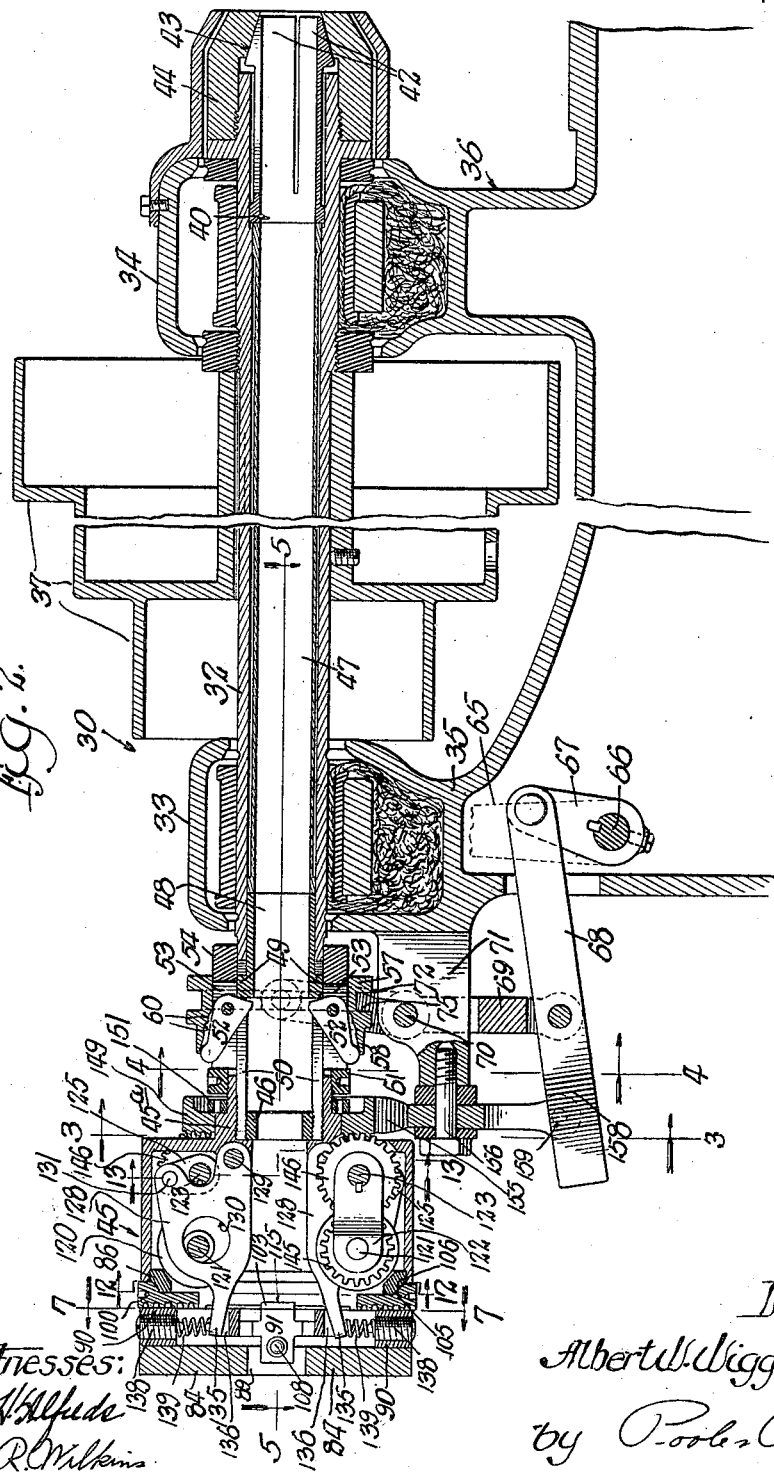

A. W. WIGGLESWORTH.
WORK FEEDING DEVICE FOR METAL WORKING AND OTHER MACHINES.
APPLICATION FILED MAY 19, 1909.
972,588.
Patented Oct. 11, 1910.
7 SHEETS—SHEET 3.
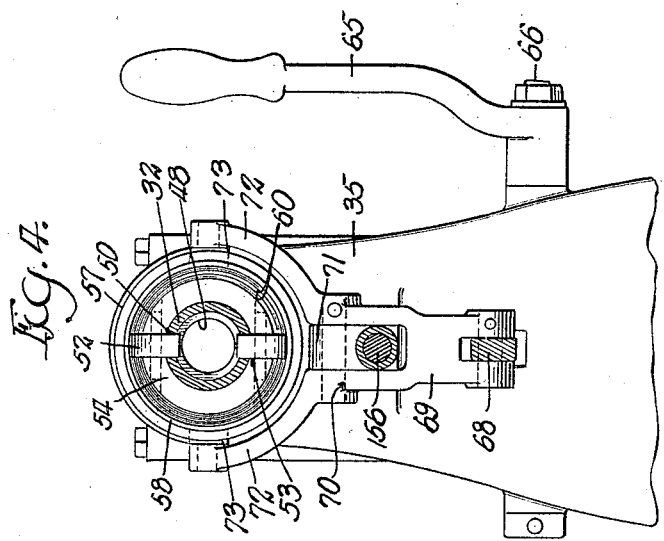
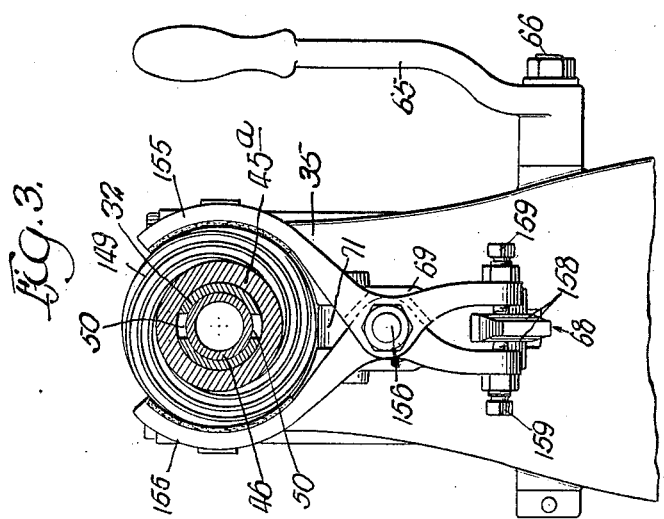
Witnesses:
Inventor
Albert W. Wigglesworth
by Poole & Brown
Attys

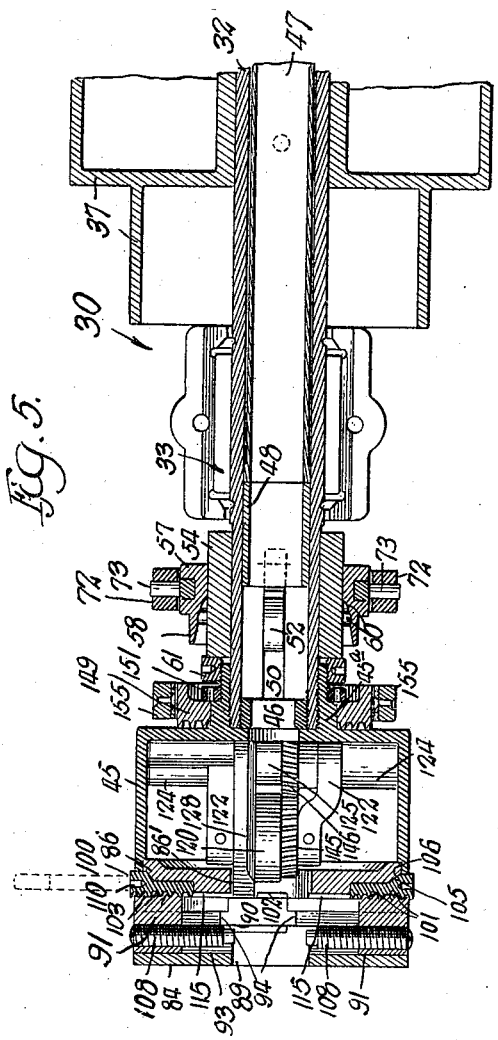

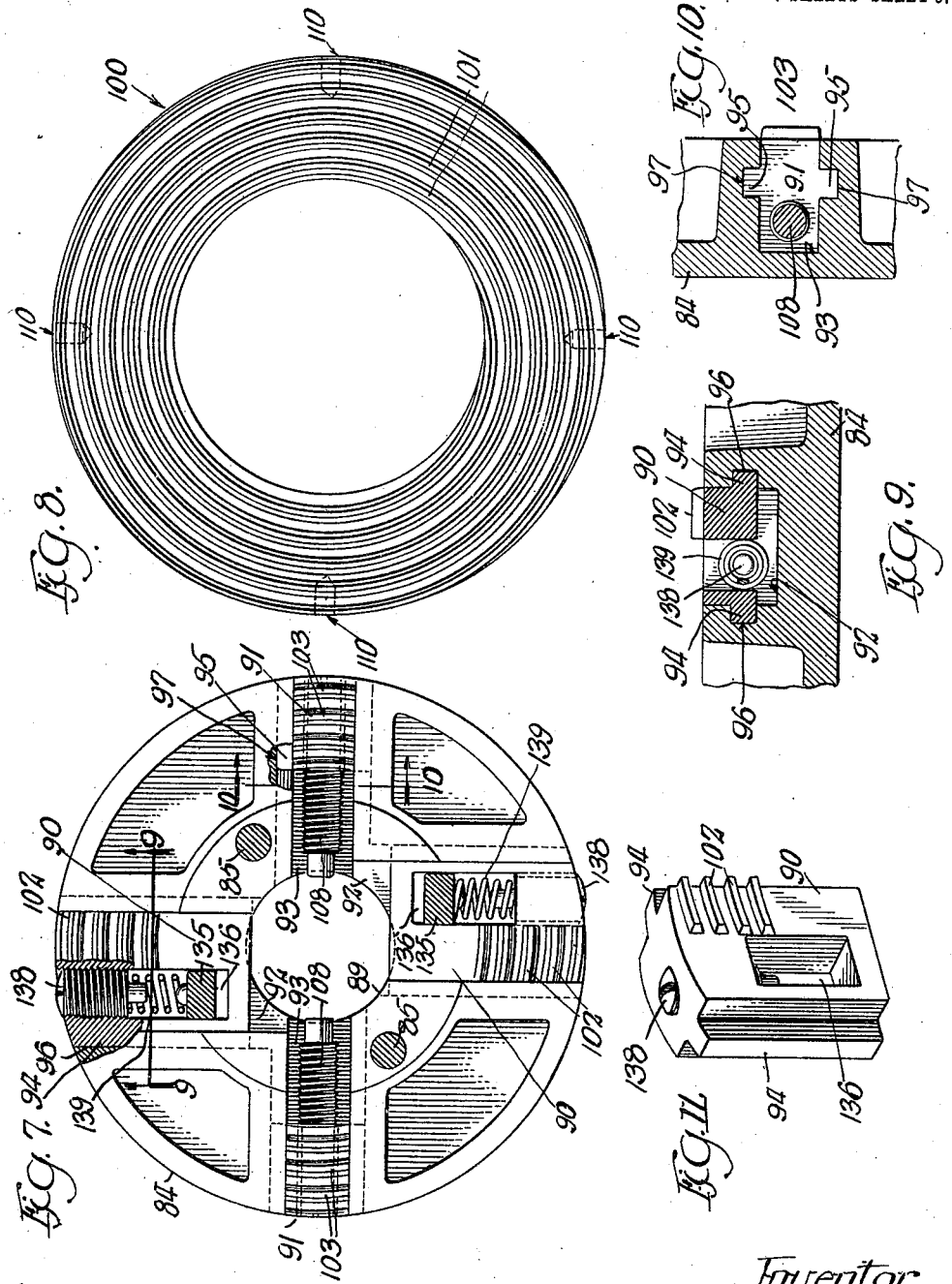

A. W. WIGGLESWORTH.
WORK FEEDING DEVICE FOR METAL WORKING AND OTHER MACHINES.
APPLICATION FILED MAY 19, 1909.
972,588.
Patented Oct. 11, 1910.
7 SHEETS—SHEET 6.
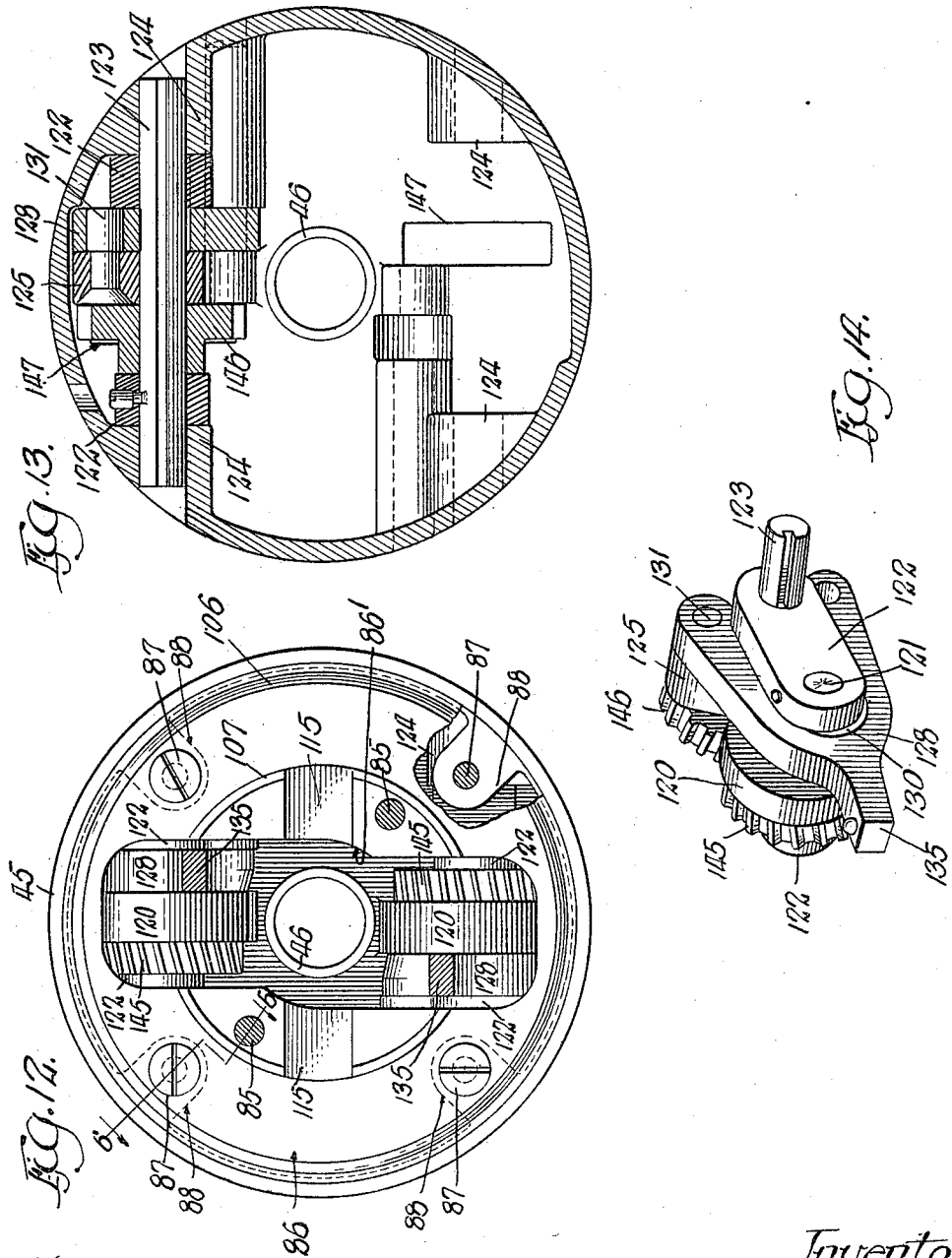

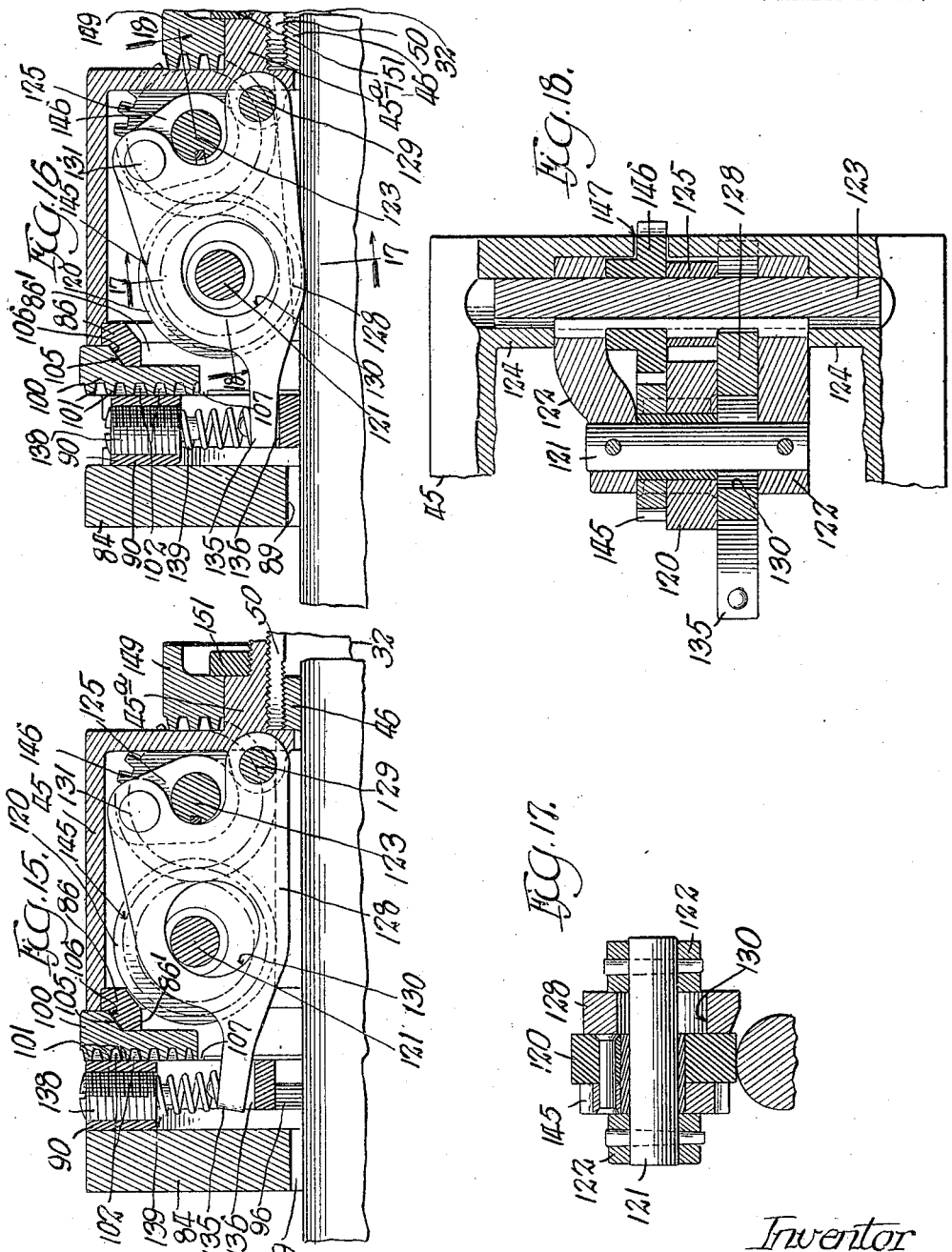

UNITED STATES PATENT OFFICE.

ALBERT W. WIGGLESWORTH, OF WILMETTE, ILLINOIS.

WORK-FEEDING DEVICE FOR METAL-WORKING AND OTHER MACHINES.

972,588.  Specification of Letters Patent. Patented Oct. 11, 1910.

Application filed May 19, 1909. Serial No. 496,956.

*To all whom it may concern:*

Be it known that I, ALBERT W. WIGGLESWORTH, a citizen of the United States, and a resident of Wilmette, in the county of Cook and State of Illinois, have invented certain new and useful Improvements in Work-Feeding Devices for Metal-Working and other Machines; and I do hereby declare that the following is a full, clear, and exact description thereof, reference being had to the accompanying drawings, and to the letters of reference marked thereon, which form a part of this specification.

This invention relates to improvements in feeding devices for feeding bar stock and like shaped work to the operating tools of metal working machinery, such as lathes, milling machines and the like. In such machines the stock to be operated upon is fed through a hollow operating shaft having means to lock the stock therein when the tool is operating on the advance end of the stock, and the rotative hollow shaft imparts rotary movement to the stock to effect the proper operation of the tool on the stock.

Among the objects of the invention is to provide a novel mechanism for automatically feeding the work to the tools.

Another object of the invention is to provide a simple and novel operative connection between the means for giving movement to the collet actuating devices and the means for operating the work feeding mechanism whereby said parts may be alternately operated by a simple movement of a hand actuated device.

A further object of the invention is to provide an improved work centering and guiding mechanism.

A still further object of the invention is to provide connections between the centering mechanism and feeding mechanism so arranged as to simultaneously center the work and to bring the feeding mechanism into operative engagement with the work.

Other objects of the invention will appear in the following description, and the invention is set forth in the appended claims.

My improvements are herein shown as applied to a turret machine of the general type illustrated in my prior application for U. S. Letters Patent Serial No. 402,800 filed November 19, 1907, embodying a rotative tool carrying turret toward which the work is fed, and which itself is adapted to be fed toward the work when the latter is locked in the rotative, hollow operating shaft, but it will be understood that the invention may be embodied in other machines to advance the work to the operating tools thereof, and is not limited in its application to metal working machines.

In the drawings:—Figure 1 is a side elevation of a turret metal working machine in which my invention is embodied. Fig. 2 is a longitudinal, vertical section, taken axially through the hollow operating shaft of the feeding mechanism and through the feeding mechanism and work centering and guiding mechanism. Figs. 3 and 4 are transverse, vertical sections on lines 3—3 and 4—4, respectively, of Fig. 2, looking rearwardly. Fig. 5 is a longitudinal, horizontal section on line 5—5 of Fig. 2. Fig. 6 is a detail section on line 6—6 of Fig. 12. Fig. 7 is a transverse, vertical section on line 7—7 of Fig. 2, looking outwardly. Fig. 8 is a face view of the screw-threaded actuating ring of the centering mechanism, taken on said line 7—7, and looking inwardly. Figs. 9 and 10 are detail sections on line 9—9 and 10—10, respectively, of Fig. 7. Fig. 11 is a perspective view of one of the centering jaws of the work centering and guiding device. Fig. 12 is a transverse, vertical section on line 12—12 of Fig. 2, looking inwardly, with parts broken away. Fig. 13 is a transverse, vertical section on the indirect line 13—13 of Fig. 2. Fig. 14 is a perspective view of one of the feed rolls and its actuating gears and controlling levers. Fig. 15 is a sectional detail, illustrating the feed head or casing and one of the feed roller actuating levers and the gears for giving motion to the feed roller. Fig. 16 is a similar view with the parts in changed positions. Figs. 17 and 18 are sections on the lines 17—17 and 18—18, respectively, of Fig. 16.

The turret machine to which my improvements are shown as applied embraces, in general terms, a horizontal bed casting 25 supported on legs or standards 26, and a turret 27, mounted on the inner end of a slide 28 that slides longitudinally on a saddle 29 supported on the bed. These general features of the machine constitute in themselves no part of the invention and need not be further described.

The work feeding mechanism 30 is supported on the end of the bed casting opposite to the turret, and embraces general features of construction as follows: 32 designates a rotative hollow work holding and work supporting shaft arranged horizontally in alinement with the turret. It is mounted in bearings 33, 34 carried by the upper ends of standards 35, 36 rising from the bed casting and is provided with cone pulleys 37. The shaft carries at its inner end, adjacent to the turret, a work holding collet 40 of familiar form. It is contracted on the work to hold the work by engagement of its tapered, split end 42 with an opposing interior tapered surface 43 of the head 44 of said shaft; the collet being shifted endwise inwardly for this purpose in a familiar manner. On the outer end of the hollow shaft is mounted a two-part casing or head 45 which is provided with a short inwardly extending sleeve 45ª which fits over and is screw-threaded to the outer end of the shaft. The sleeve is locked to the slotted shaft 32 by a screw-threaded tapered locknut 46 in the extreme slotted end of said shaft. Said casing or head incloses and supports the work centering and feeding mechanism which is hereinafter described. Said collet is forced endwise by means of a hollow collet actuating member 47 contained within the hollow shaft and extending outwardly to near its outer end. The collet actuating member consists of a long tube 47 and a short outer tube 48, it being preferably made of the two parts, though it may be made of a single piece. The outer shorter section 48 of the collet actuating member is provided at its outer end with lugs 49, 49 which extend outwardly through oppositely located longitudinal slots 50 in the outer end of the operating shaft, (Figs. 2, 3 and 5.) The said collet actuating member is shifted endwise to close the collet on the work by means of oppositely arranged, short levers 52, 52, the inner ends of which extend into the slots 50 for engagement with the lugs 49. Said levers are pivoted in slots 53 in a collar 54 which surrounds and fits closely on the operating shaft at its slotted portion. The outer or free ends of said levers are swung inwardly to swing the other ends thereof against the lugs 49, and to thereby force the collet actuating member inwardly, through the medium of a ring 57 which surrounds the collar 54 and slides endwise thereon. Said ring 57 is formed with a rearwardly extending, internally flared or tapered flange 58 which incloses the outer ends of the actuating levers 52, so that when said ring is moved outwardly the engagement with the outer ends of the levers with the flaring or tapered inner surface of the flange serves to move the outer ends of the levers toward each other, and thereby shift the collet actuating member inwardly. Preferably the inner tapered surface of the actuating ring 57 is provided at its inner or base portion with one or more annular depressions 60, and the outer ends of the levers 52 are rounded to enter said depressions when the actuating ring is forced to the outer limit of its movement. This arrangement constitutes locking means which avoids accidental spreading movement of the levers 52 under the influence of the spring collet, which spreading movement would have the effect to shift the actuating ring 57 inwardly and permit the collet to expand away from the work. The collar 54 is held from shifting outwardly on the shaft 32 by means of a lock nut 61 which surrounds and is screw-threaded on the sleeve 45ª of the casing 45 (Figs. 2 and 5). The said lever actuating ring 57 is moved endwise on the collar 54 to actuate the levers through devices made as follows: 65 designates a hand lever which is fixed to one end of a horizontal rock shaft 66 that is mounted in the bed plate beneath the standard 35. The rock shaft carries between its ends a crank arm 67 (Fig. 2) to the outer end of which is pivotally connected a rearwardly extending bar 68. 69 is a forked shifting lever which is pivoted between its ends on a pivot pin 70 mounted in a bracket 71 that extends forwardly from the standard 35. The lever is pivoted at its lower end to the bar 68, and the upper diverging arms 72 of the lever extend on opposite sides of the actuating ring 57, and are provided at their ends with inwardly extending pins or lugs 73 for engagement with an annular groove 75 formed in the periphery of said actuating ring, the ring being free to rotate relatively to said lever. With this construction, when the hand lever 65 is swung inwardly or toward the collet, the actuating ring 57 is forced outwardly over the levers 52 and serves to force the collet actuating member inwardly and close the collet upon the work. When the ring 57 is moved inwardly the spring collet is automatically opened and the collet actuating devices restored to normal inoperative positions.

Referring now to the construction and arrangement of the work centering and guiding and work feeding mechanisms, the same are made as follows: The feeding mechanism is contained within and supported on the casing 45, and the centering and guiding mechanism is supported upon and within a cap member 84, constituting the outer end of said two part casing, and which is removably attached to the casing proper. This said cap member 84 is fixed to the casing proper by means of bolts 85, 85 (Figs. 6, 7 and 12) which extend horizontally therethrough and have screw-threaded engagement with a disk fitted in the outer open end of the casing body and extending transversely across the same; and said plate 86 is attached to the casing body by means of countersunk screws 87 which extend through the disk and into screw-threaded openings of lugs 88 extending radially inwardly from the cylindric wall of the casing body. Said cap member is provided with an opening 89 in axial alinement with the tubular operating shaft 32 through which the work is inserted into the shaft. The disk 86 is provided with an irregular transverse opening 86¹ through the central part of which the work is passed, and the ends of which are shaped to accommodate the feeding mechanism, as will hereinafter more fully appear. The work centering and guiding mechanism embraces a plurality of radially movable jaws 90, 91 which are supported in, and are slidable toward and from the axial opening of the cap member. Said jaws are preferably four in number, being arranged in opposite alined pairs and disposed symmetrically about the axis of the cap member. Said jaws are slidable in ways 92, 93 formed in said cap member, and the jaws are provided at their side edges with guide ribs 94, 95 which engage grooves 96, 97 at the sides of the ways 92, 93. Said jaws are moved inwardly and outwardly in their ways by means of a spirally screwthreaded ring 100 arranged between the disk 86 and the cap member 84, as most clearly shown in Figs. 2, 5, 6, 15 and 16. The spiral thread 101 on the outer face of said actuating ring 100 engages screw-threads 102, 103 formed on the inner or rear faces of the jaws 90 and 91, respectively. By rotating said actuating ring in one direction or the other, the jaws are simultaneously moved inwardly or outwardly, and at equal speeds. Said spirally screw-threaded actuating disk is provided on its rear side face, near its periphery with a beveled or inclined annular bearing surface 105 which engages an opposing annular bearing surface 106 on the front face of the disk 86, as best shown in Figs. 6, 12, 15 and 16, thereby affording a bearing to hold the jaw actuating ring in place and permitting it to rotate freely about its central axis. The said disk 86 is also provided radially inside the annular, beveled bearing surface 106 with an inner cylindric bearing hub or flange 107 upon which the inner margin of the jaw actuating ring 100 bears, as more clearly shown in Figs. 5, 6 and 12. The centering jaws 90, 90, located opposite each other, are arranged to directly engage at their inner ends the work to center the same. The other centering jaws 91, 91, located opposite each other, and at an angle to the jaws 90, are provided with adjusting screws 108, 108 which extend through longitudinal screw-threaded openings in said latter jaws from the outer ends thereof a distance beyond the inner ends of the jaws; and said adjusting screws 108 constitute parts of the jaws 91, the inner ends of which directly engage the work to center the same. The outer ends of the adjusting screws 108 of the jaws 91 are slotted for engagement by a suitable implement to adjust the same inwardly and outwardly in the jaws. The provision of the screws 108, or other analogous adjustable parts of the two jaws 91 constitute means for independently adjusting the said jaws 91 to work of different cross-sectional shapes, independently of the other jaws 90. If the work to be operated upon is a cylindric bar, the adjustment of the engaging ends of the jaws will be such that said engaging ends of the jaws are located at equal distances from the axis of the centering mechanism, and when the bar is inserted through the centering and feeding mechanism into the hollow shaft, the jaws will move inwardly to an equal or uniform extent for contact with the work. When the work is of irregular cross-sectional shape, however, the adjusting screws 108 of the jaws 91 may be adjusted inwardly toward or away from the central axis of the centering mechanism such distance that when all of the jaws are moved simultaneously inwardly, through the action of the spirally screw-threaded ring 100, said jaws will engage the irregularly shaped work at four different points to center the work in axial alinement with the work holding collet 40. The said screw-threaded actuating ring 100 is provided in its periphery with one or more sockets 110 to receive a suitable implement by which the same may be readily rotated to adjust the jaws inwardly and outwardly. The front face of the disk 86 is provided in line with the ways 93 for the centering jaws 91 with clearance spaces 115 of a depth to receive the screw-threads of said jaws 91 when said jaws are moved to their innermost positions.

Referring now to the feeding mechanism by which the work is advanced through the hollow operating shaft 32 toward the operating tool or tools, said parts are made as follows:—It may be first premised that the work feeding mechanism embraces feed rollers which are arranged on opposite sides of the work in rear of the centering mechanism. Said rollers are carried by a system of levers so arranged that they are movable toward and from the work, and they are preferably pressed toward the work at the same time the centering jaws are moved inwardly to center the work. Said rollers are operatively connected with and receive power to drive the same from the rotative shaft 32 through gear connections which are arranged to be connected at will with said rotative shaft, such connection being effected after the feed rollers have been pressed upon the work. By rotating the shaft in one direction the work may thus be fed inwardly toward the tool, and by rotating it in the opposite direction the work may be retracted from the tool. The manually operable lever 65 may be so connected with the feeding roller gearing connecting and disconnecting means that when the collet is released from the work, a simple movement of the lever 65 will connect the feed roller actuating gears to the power, and vice versa.

Referring now to the details of construction of the feeding mechanism the same are made as follows: 120, 120 designate the feed rollers referred to which are located within the casing 45 on opposite sides of the central axis thereof and, therefore, on the opposite sides of the work extending through the casing. The said feed rollers are rotatively mounted on short horizontal shafts 121, which latter are fixed at their opposite ends to the forward ends of horizontally disposed lever arms 122, 122. Said lever arms 122 are non-rotatively fixed at their rear ends to longer horizontal shafts 123, 123 which extend transversely across the casing and are mounted in bearing lugs 124 within the casing (Figs. 12, 13 and 18). Fixed to the said shafts 123, between lever arms 122, 122, are outwardly and forwardly extending lever arms 125, 125. 128, 128 designate levers which are pivoted at their rear or inner ends to pivot pins 129, 129 at the inner end of the casing 45, located radially inside and slightly in rear of the rock shaft 123. The said levers 128 are located between the feed rollers 120 and one of the lever arms 122 and are provided with openings 130 through which the roller shafts 121 extend. The said levers 128 are pivoted at their radially outer sides with the outer or free ends of the lever arms 125, the pivotal connections consisting of pivot pins or lugs 131. The rear ends of said levers 128, between the pivot pins 129 and 131, are recessed or cut away to receive the rock shafts 123, as most clearly shown in Figs. 2, 15 and 16. The feeding rollers 120, 120 extend forwardly into the ends of the transverse opening 86¹ in the disk 86, as shown in Figs. 2, 15 and 16. The said feeding roller controlling levers 128 are provided with forward extensions 135, 135 which extend through the transverse opening 86¹ of the disk 86 for connection with the centering and guiding mechanism, whereby the levers are swung inwardly and the rollers pressed upon the work at the same time the work is centered by said centering and guiding mechanism. As herein shown, the said levers 128 are located in rear of the plane or non-adjustable centering jaws 90, which latter are located in front of the transverse opening 86¹ of the disk 86. The said centering jaws 90 are formed with openings 136 to receive the lever extensions 135, as most clearly shown in Figs. 2, 7, 15 and 16. The said jaws 90 are provided in line with the openings 136 with longitudinal screw-threaded apertures to receive adjusting screws 138 which extend from the outer ends of said jaws into said openings 136. Interposed between the inner ends of said adjusting screws 138 and the outer sides of the lever extensions 135 are spiral springs 139 which yieldingly press the lever extensions 135 against the bottom walls of the notches or openings 136 in said jaws. Thus it will be seen that when the jaws are moved inwardly, through the medium of the screw-threaded adjusting ring 100, the levers 128 are simultaneously swung inwardly and carry the rollers against the work. When the rollers are brought into contact with the work the springs 139 permit the levers 128 to yield backwardly slightly while exerting force to yieldingly hold the feeding rollers against the work. The tension of said springs may be varied as desired, through the action of the adjusting screws 138, to vary the pressure or force by which the said feeding rollers are pressed against the work.

The arrangement of the system of actuating levers for the feeding rollers is designed to effect movement of the said rollers toward and from the work in correspondence to the speed of movement given to the outer or projecting ends 135 of the levers 128, whereby the feed rollers approach the work at substantially the same speed as the centering and guiding jaws approach the work. This will be readily understood by a consideration of the fact that the levers 128 constitute in themselves primary bell crank levers to which power is applied, the longer arms thereof extending from the outer extensions 135 to the axes of the pivot lugs 129, and the shorter arms from said axes to the axes of the pivot lugs 131; and that the lever arms 125 constitute the shorter arms, and the lever arms 122 constitute the longer arms, of secondary bell crank levers which are pivoted at their shorter arms to the primary bell crank levers and carry at the forward ends of their longer arms said feeding rollers. The ratio of the arms of the primary bell crank levers are substantially the same as the ratio of the arms of the secondary bell crank levers, whereby the shorter swing of the shorter arms of the primary bell crank levers, relatively to their longer arms is compensated by the longer swing of the longer or roller carrying arms of the secondary bell crank levers relatively to their shorter arms. Manifestly, if the feeding rollers be carried directly by simple levers, the speed of their approach to and retraction from the work would not be equal to the speed of the outer ends of said levers to which actuating power is applied.

The means for operating the feeding rollers by power derived from the rotating shaft 32 are constructed and arranged as follows: Affixed to said feeding rollers are gears 145 which mesh with gears 146 that are rotatively mounted on the rock shafts 123 between the lever arms 125 and the adjacent lever arms 122. The said gears 146 extend through openings 147 in the rear end of the casing 45 and mesh with a scroll gear 149 which is rotatively mounted on the attaching sleeve 45ª of the casing (Figs. 2, 3, 5, 15 and 16). Inasmuch as said gear wheels 145 and 146 are located off the center of the scroll gear 149, one at each side of said center, the teeth of the gear wheels 146 are obliquely inclined relatively to the axis of rotation of the gear wheels, as shown in Figs. 5, 12 and 14 for proper presentation to the spiral teeth of the scroll gear. The said scroll gear 149 is normally free to rotate with the casing 45, and when said parts thus rotate together no relative movement of the scroll gear and gear wheels 146 occur and, therefore, the gear wheels 145 and 146 transmit no driving or rotative movement to the feeding rollers. Means are provided for locking the said scroll gear 149 fixed or stationary with respect to the frame, and when said gear is so locked or fixed the rotation of the gear wheels 146, relatively to the meshing scroll gear serves to rotate said feeding rollers to feed or advance the work through the hollow operating shaft. The said scroll gear 149 is confined in place by means of a lock nut 151 which has screw-threaded engagement with the attaching sleeve 46 of the casing 45 and bears against the inner or rear face of the scroll gear.

The means herein shown for locking the scroll gear fixed or stationary relatively to the machine frame comprises a friction clutch consisting of two levers 155, 155, best shown in Figs. 1, 2 and 3, which are curved at their upper ends to conform with the curved periphery of the scroll gear. They cross each other below the head or casing 45 and are pivoted at their overlapped or crossed portions to a pivot pin 156 carried by the bracket 71. The outer end of the connecting bar 68 of the shipping lever 69 extends between the lower separated ends of said clutch levers and said bar is formed with a wedge shaped portion 158 which serves, when the bar is moved outwardly, to spread the lower ends of the clutch levers apart and to force the upper curved ends thereof against the periphery of the scroll gear to lock it from rotation. Screws 159, 159 which extend through and are fixed to the lower ends of said levers constitute means for adjusting the action of the bar to said levers. The inner curved faces of said clutch levers are provided with suitable friction surfaces, as leather or the like, to increase the co-efficiency of friction between the clutch levers and the scroll gear. When the scroll gear is thus locked or fixed with respect to the machine frame, rotation of the head or casing 45 revolves the feeding roller gear wheels 146 around the toothed face of the scroll gear, and the meshing engagement of the gear wheels 146 with the spiral teeth of the scroll gear serves to impart rotative feeding movement to the feeding rollers. The direction of rotation of the feeding rollers depends upon the directions of rotation of the shaft 32 and the head or casing 45; it being understood that rotation of said shaft and head or casing in one direction rotates the feeding rollers to advance the work through the hollow feed and operating shaft, and that the rotation of said shaft and head in the opposite direction serves to reverse the feeding rollers to retract or withdraw the work.

The connection of the hand lever 65, through the medium of the bar 68, with the work holding collet actuating devices and with the scroll gear clutch enables the collet and scroll gear clutch to be alternately actuated by a simple manually directed movement; the arrangement being such that the direction of movement of said lever to release the collet from the work is the same direction in which the lever is swung to lock the scroll gear to set in motion the feeding roller actuating gears. Conversely the direction in which the lever 65 is swung to release the scroll gear, to permit it to rotate with the shaft 32 and the work feeding mechanism casing, is the same direction in which the lever is further swung to lock the collet on the work. In an intermediate or neutral position of the lever both the collet and scroll gear clutch are released.

In the operation of the machine the work is inserted through the centering and feeding head into the hollow shaft 32 at a time when said shaft is stationary. Thereafter the centering and guiding jaws are slid inwardly, through the action of the spirally screw-threaded ring 100 to center the rear end of the work and to press the feeding rollers against the work. Power is thereafter transmitted to the shaft 32, through the pulleys 37, to rotate said shaft, and the hand lever 65 is swung rearwardly and operates, through the bar 68 and clutch levers 155, to lock the scroll gear 149 fixed with respect to the machine frame. Thereupon the feeding rollers are set in motion to advance the work toward the turret 27 or other tool holding device. The work continues to advance until it is arrested by contact of its advance end with a suitable stop, as the stop 162 carried by the turret. Thereafter the hand lever 65 is swung forwardly to release the clutch from the scroll gear and arrest the driving motion of the feeding rollers. The continued forward movement of the lever operates, through the shipping lever 69, the actuating ring 57, the levers 52 and the collet actuating member 47 to close or contract the collet upon the work and thereby hold the work fixed from endwise movement in the rotating shaft 32. The work is now in position to be operated upon by the tool, as the tool is pressed, through the action of the feed mechanism of the turret or other holding device, against the rotating work. After a given operation has been effected on the advance end of the work, thus advanced to the tool, the work may be separated from the tool either by sliding the turret backwardly or by reversing the direction of rotation of the shaft 32, depending upon the character of the operation of the tool. If the work is to be retracted from the tool, the collet is released from the work, the rotation of the shaft 32 reversed and the scroll gear clutch actuated to lock the scroll gear from rotation. Such reversal of the shaft 32 when the scroll gear is thus locked, has the effect to reverse the rotation of the feeding rollers, with the result of retracting the work from the tool carrying turret. The retraction of the work from the turret may be to such extent only as to permit the turret to be rotated to present another tool to the work, or the work may be retracted to a position to be acted upon by the use of the usual cutting knife 163 to cut off the finished advance end of the work. A supporting and guiding bar 164 is arranged in rear of the feeding device and is provided at its upper end with a guiding eye or opening in line with the work receiving opening of the device to support and guide a bar or stock in rear of the feeding device. After the work is advanced through the device, with the rear thereof past the feeding rollers, a new piece of stock is inserted with its advance end between the feeding rollers, and the advance of the new piece will push ahead of it the shorter piece until the shorter piece is used up.

I claim as my invention:—

1. In a work feeding device, the combination with a hollow, rotative shaft through which the work is fed, and a work holding collet carried by the shaft, of work feeding mechanism located at the outer end of the shaft, embracing feeding rollers, operating gears for said rollers, a scroll gear surrounding and concentric with said shaft meshing with the feeding roller operating gears, a hand lever operatively connected to the collet for actuating the collet to lock it to the work, embracing a pivoted shipping lever and an endwise movable bar connecting the hand lever with the shipping lever, and a clutch device for locking said scroll gear from rotation, and said bar being provided with a wedge shaped portion arranged to actuate said clutch upon endwise movement of said bar.

2. In a work feeding device, the combination with a hollow, rotative shaft through which the work is fed, of a work centering mechanism at one end of the shaft embracing radially movable centering jaws, and a work feeding mechanism in advance of said centering mechanism comprising work feeding rollers, a system of compound levers carrying said rollers to move them toward and from the work, and operative connections between said centering jaws and said levers, said levers being proportioned to carry the rollers toward the work at the same speed at which the centering jaws move toward and from the work.

3. In a work feeding device, the combination with a hollow, rotative shaft, of a work centering mechanism at one end of said shaft and work feeding mechanism in advance of the work centering mechanism comprising two rollers movable toward and from the work, a system of levers for moving each roller toward and from the work, comprising a pivoted primary bell crank lever, one arm of which is connected with and actuated by the work centering mechanism, and a secondary bell crank lever one arm of which carries a feeding roller, and the other arm of which is pivoted to the second arm of the primary bell crank lever, said lever arms being proportioned to carry the rollers toward the work at the same speed at which the ends of the lever arms connected with the centering mechanism are moved toward each other.

4. In a work feeding device, the combination with a hollow, rotative shaft and a casing mounted on the end thereof provided with a work passage in alinement with the shaft, of centering mechanism mounted in the casing comprising a plurality of radially movable centering jaws, and work feeding mechanism in rear of said centering mechanism arranged in two sets, one at each side of the work passage of the casing, each comprising a lever pivoted at its rear end to the casing and connected at its other end with one of said jaws, a rock shaft mounted in the casing, a lever arm fixed at one end to said rear shaft, a rotative feeding roller carried by the other end of the rock shaft, and a second lever arm fixed to said rock shaft and pivotally connected with said first lever.

5. In a work feeding device, the combination with a hollow, rotative shaft and a casing carried by one end of the shaft and provided in alinement with the shaft with a work feeding passage, of a work centering mechanism embracing a plurality of radially movable jaws provided with screw-threads, a spirally screw-threaded ring rotatively mounted in the casing for moving the jaws inwardly and outwardly, and work feeding mechanism within the casing embracing rollers which are adapted to be pressed upon the work, and roller actuating levers pivoted in the casing and operatively connected with said radially movable centering jaws.

6. In a work feeding device, the combination with a hollow, rotative shaft and a casing carried by one end of the shaft and provided in alinement with the shaft with a work feeding passage, of a work centering mechanism embracing a plurality of radially movable jaws provided with screw-threads, a spirally screw-threaded ring rotatively mounted in the casing for moving the jaws inwardly and outwardly, work feeding mechanism within the casing embracing rollers which are adapted to be pressed upon the work, roller actuating levers pivoted in the casing and operatively connected with said radially movable centering jaws, and springs interposed between said levers and jaws whereby the rollers are yieldingly pressed against the work through the action of said jaws.

7. In a work feeding device, the combination with a hollow, rotative shaft and a casing mounted on one end thereof and provided with a work feeding passage, of a centering mechanism comprising radially slidable jaws in said casing arranged in opposite pairs, and disposed symmetrically about said work feeding passage, feeding rollers in said casing, and roller actuating levers pivoted to the casing, two of said jaws being provided with openings, and the levers being provided with extensions which project into said openings.

8. In a work feeding device, the combination with a hollow, rotative shaft and a casing mounted on one end thereof and provided with a work feeding passage, of a centering mechanism comprising radially slidable jaws in said casing arranged in opposite pairs, and disposed symmetrically about said work feeding passage, feeding rollers in said casing, roller actuating levers pivoted to the casing, two of said jaws being provided with openings, and the levers being provided with extensions which project into said openings, and springs in said openings arranged between the said extensions and the outer end walls of the openings to yieldingly hold said extensions against the inner walls of said openings.

In testimony, that I claim the foregoing as my invention I affix my signature in the presence of two witnesses, this 24th day of April A. D. 1909.

ALBERT W. WIGGLESWORTH.

Witnesses:
LYNN C. BEADLE,
W. DITFURTH.